Figure 4:
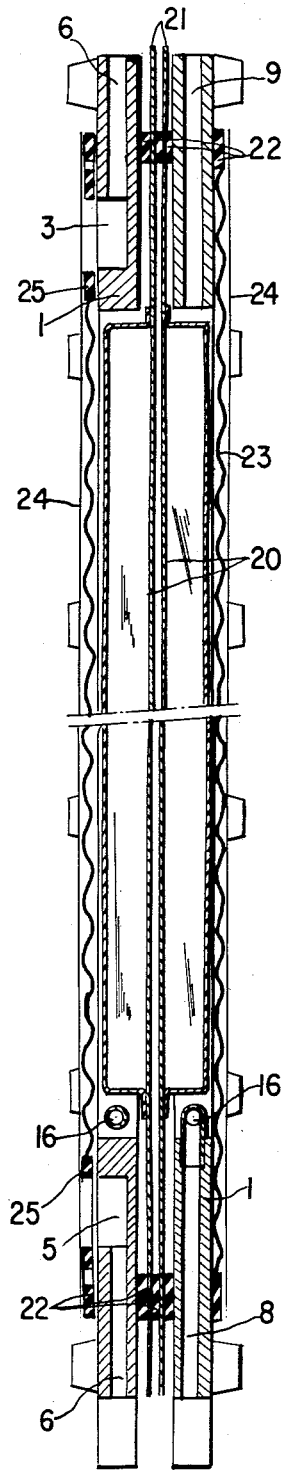

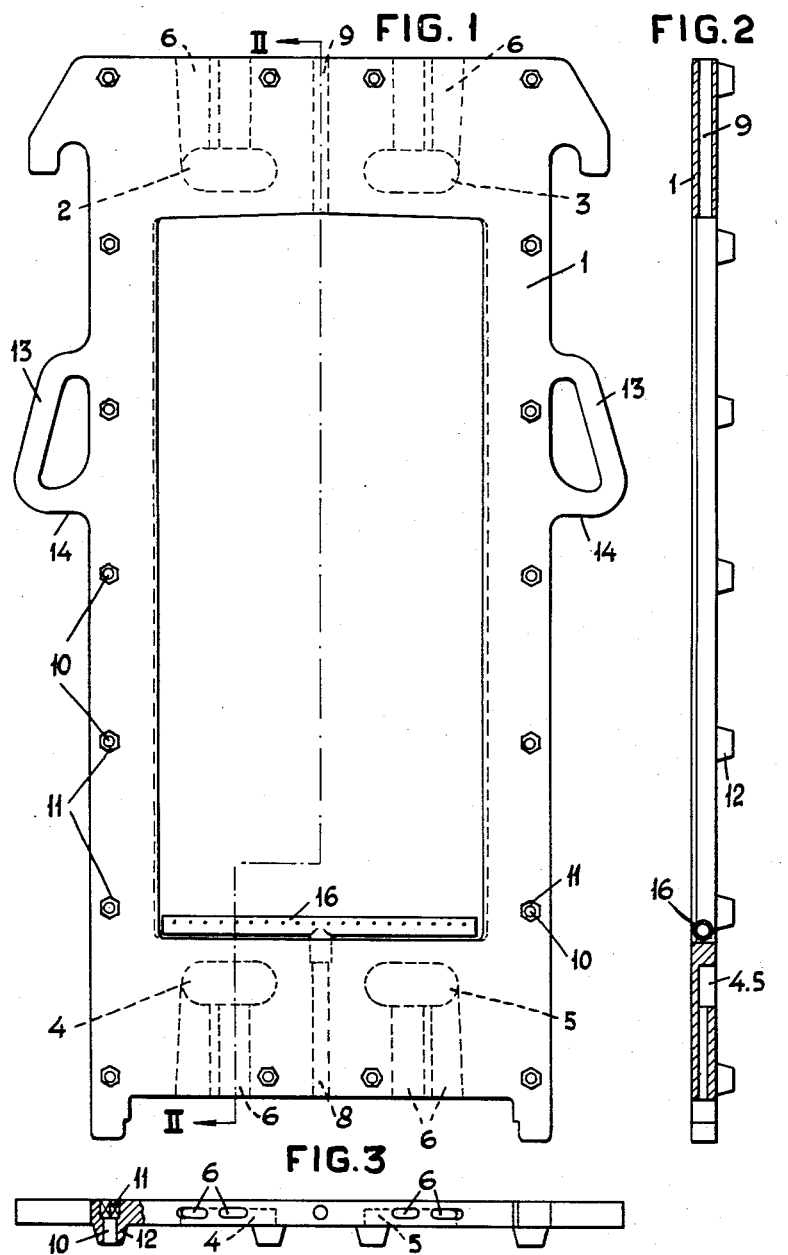

INVENTORS
JOHN REUEL WILSON
WILLEM IN 'T VELD
BY
ATTORNEYS

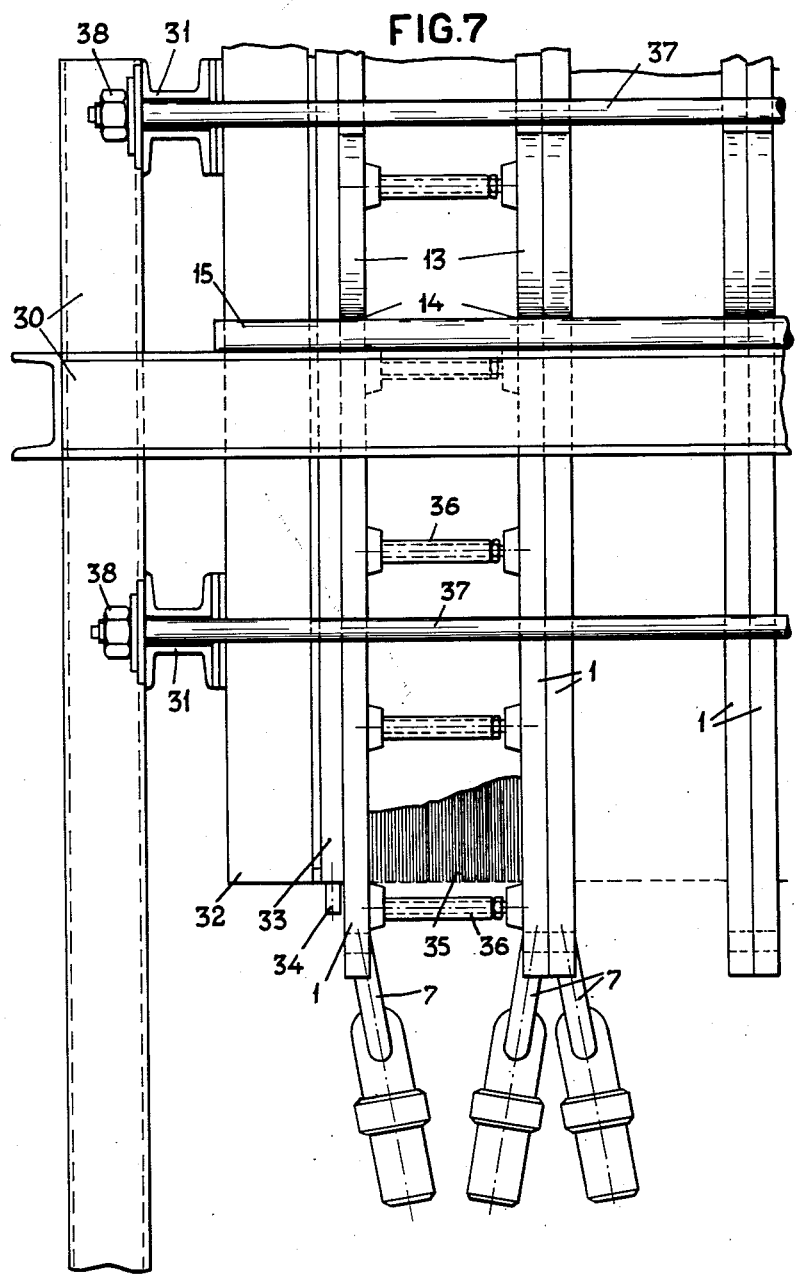

United States Patent Office 2,987,464
Patented June 6, 1961

2,987,464
MULTICELL ELECTRODIALYSIS APPARATUS
John Reuel Wilson, Pretoria, Transvaal, Union of South Africa, and Willem in 't Veld, The Hague, Netherlands, assignors to Nederlandse Organisatie voor Toegepast-Natuurwetenschappelijk Onderzoek ten Behoeve van Nijverheid, Handel en Verkeer, The Hague, Netherlands
Filed Jan. 7, 1958, Ser. No. 707,638
Claims priority, application Netherlands Jan. 14, 1957
6 Claims. (Cl. 204—301)

The invention relates to a multicell electrodialysis apparatus consisting of alternately positioned positive and negative membranes, separated by gaskets and supporting devices present therebetween, so that concentrating cells and desalting cells are alternately formed, which apparatus is provided with end-cells with electrodes and in which apparatus intermediate cell frames of a special type are present between some of the membranes, which intermediate cell frames may be provided with separate supply and discharge ducts for dialysate and/or rinsing liquids. In such apparatus the portions of the membrane packet between an end-cell and an intermediate cell frame and between two intermediate cell frames contain 20 to 200 or preferably 40 to 150 membranes. The whole membrane packet is held together as a filter press. One of the difficulties met with in using such apparatus which may contain many hundreds of membranes in all, is that with a rupture of one of the membranes the whole apparatus must be taken apart, the damaged membrane replaced and the whole apparatus built up again, which takes very much time.

The invention consists in that the intermediate cells are made up of two separable half-intermediate-cell frames, facing each other in a mounted position like reflected images and that means are present for constructing each portion of the packet with the half-intermediate-cell frames belonging thereto as a manageable and replaceable unit. If leakage by membrane rupture is observed in an apparatus it is possible to remove, in its entirety, the portion of the packet, an intermediate cell unit, in which the leakage has occurred and to replace it by a new similar portion which has been prepared and tested beforehand. After compressing again the whole membrane packet with end-cells and intermediate cell frames and after the various connections have been effected, the apparatus is again ready for use.

For the means mentioned, use is advantageously made of a number of connecting rods the ends of which are provided with inner screw thread and fitting studs or bolts. To that end the half-intermediate-cell frames are provided with a number of counter-sunk holes for bolts along the circumference of these frames. The counter-sunk holes are preferably made deep enough so that the bolt heads have some play within the counter-sunk holes when the apparatus is compressed.

As a result of the lateral supply ducts in the wall of the intermediate cell frame (here laterally seen with respect to the complete apparatus, thus approximately perpendicular to the direction of the field of the electric current) the complete cell span formed by two intermediate cell frames becomes a relatively thick one, but since there is only a small number of these thick intermediate cell frames in the whole apparatus and these intermediate cell frames can be connected as concentrating cells this is no serious objection. Precautionary measures should be taken to see that the liquid-velocity in the cell span formed by two abutting intermediate cell frames along the membranes between them and the desalting cells adjoining the cell span is of the same order of magnitude as the liquid-velocity in adjacent cells.

The invention is illustrated in the drawing by means of an embodiment in which

FIG. 1 represents a front view of a half-intermediate-cell frame and

Figure 5:
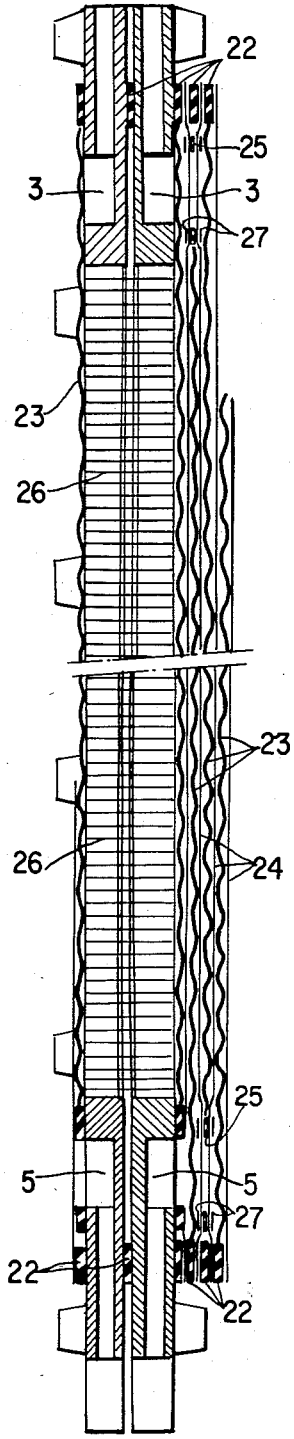
Figure 6:
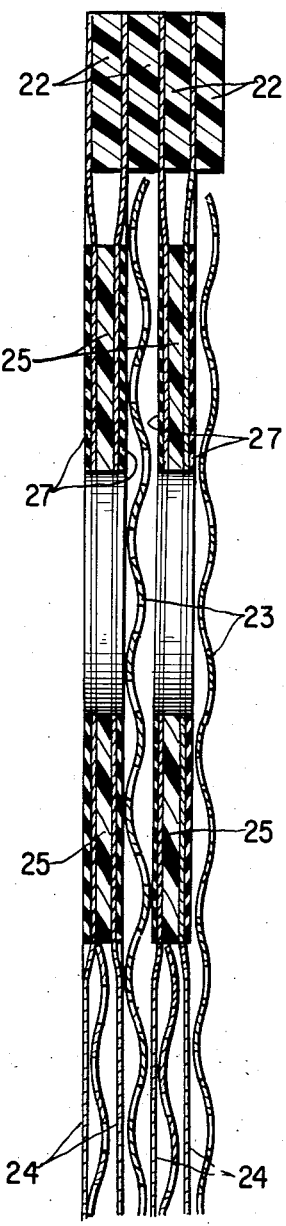

FIG. 2 a cross-section of FIG. 1 according to the line II—II,

FIG. 3 a bottom view, partial cross-section of FIG. 1,

FIG. 4 a cross-section of a complete intermediate cell span with frames according to FIG. 1 and provided with electrodes, FIG. 5 a cross-section of a complete intermediate cell span provided with filler material, FIG. 6 a considerably enlarged detail of some cells and their packings and FIG. 7 part of the complete apparatus with a few supply nozzles for the intermediate cell units.

FIGS. 1, 2 and 3 show the intermediate cell frame 1 with the holes 2, 3, 4 and 5 corresponding with the inner conduits for supply and discharge of the liquids in the adjoining portions of the membrane packet. These holes are provided with conduits 6 for the supply and discharge of liquids to the holes 2, 3, 4 and 5, and to the adjoining portions of the membrane packet. The conduits 6 end in the lower and upperside of the frame 1 respectively and can be connected with the connecting pieces 7 indicated in FIG. 7.

The frame 1 is furthermore provided with ducts 8 and 9 for the supply and discharge of special rinsing liquids, which can also be provided with connecting pieces (or barring pieces). This connection can be effected e.g. by two bolts the ends of which have been cast in the frame (not indicated in the drawing).

Furthermore the frame 1 is provided with a large number of holes 10, containing a hexagonal and wider part 11. By means of bolts or studs through these holes 10 and tightening bolts co-operating therewith (36, FIG. 7) the portion of the packet formed by two half intermediate-cell frames and the intermediate membranes and gaskets therebetween can be kept together as an intermediate cell unit. The wide part 11 of the holes 10 is longer than the bolts or bolt heads to be used, so that if the whole apparatus is pressed together, these bolts or heads have a certain clearance. At the other end of the holes 10 there are provided protuberances 12, as shown in the drawings. These protuberances are not necessary, but have been provided to ensure that a good strong frame is obtained, the thickness of the frame 1 being as small as possible in connection with the ducts 6 and a maximum clearance in the holes 11.

Furthermore the frame 1 is provided with supporting lugs 13 with under faces 14 with which, as can be seen in FIGURE 7, the intermediate cell units of the complete apparatus rest on and can slide along two bars 15, which are fixed to the outer frame 30 (see FIG. 7). For uniform rinsing of the cell-space of the intermediate cell span a liquid distributor 16 can be mounted within the half-intermediate cell frame 1, being in connection with the supply duct 8. Frame 1 can furthermore be provided with hoisting lugs and the like.

FIG. 4 shows two box-shaped electrodes 20 with brims 21 fitting between the half-intermediate cell frames 1. These brims jut out beyond the cell frames 1 at certain places not indicated in the drawing for the attachment of electric connections.

This figure shows gaskets 22 which are similar to the gaskets for the ordinary cells, membrane supports 23 (consisting of a considerably perforated corrugated plate of electrically non-conductive material) and membranes 24, separating the electrode cell from the adjacent desalting cell. The ducts 3 and 5 in the left half-intermediate cell frame of FIG. 4 are separated from the electrode cell by packing rings 25. The right part of this figure is a section through the supply and discharge ducts 8 and 9 for the rinsing liquid. Where electrodes 20 are introduced into the half-intermediate-cell frames 1, a separate supply 8 and discharge 9 duct for electrode rinsing liquid should always be present. The electrode 20 to be introduced may be either an anode or a cathode. Where two electrodes are employed in the same intermediate cell span, they should be mutually electrically insulated in a satisfactory way.

It will be advantageous to construct the intermediate cell frame 1 in such a way that the manipulating required for replacement of a concentrating intermediate cell (FIG. 5) span by an electrode intermediate cell span (FIG. 4) can also be effected when the portions of the gasket and membrane packet as such have already been mounted between two half-intermediate-cell frames to form a manageable unit.

FIG. 5 shows an intermediate cell span which is not used as an electrode cell. The space in the two half-intermediate-cell frames is filled up with grid-shaped material 26 with holes in the direction of the electric current. This grid shaped material 26 can be a perforated plate containing holes in the same direction as the path of the electric current, as, for example, a honeycomb-shaped material with holes. On both sides of the half-intermediate-cell frames there are membrane supports 23, followed by membranes 24. The space formed between the grid-shaped material 26 and the membrane 24 has practically the same liquid volume as the adjacent concentrating and diluting cells and is connected to the supply and discharge ducts, preferably to the duct containing liquid to be concentrated 3 and discharge duct 5. It is also possible to rinse these two cell spaces, via special supply 8 and discharge 9 ducts with another suitable liquid.

In the left half of FIG. 5 the upper side of this cell-space adjoining the intermediate-cell span is connected to duct 3 and the lower side is not connected to the duct 5, but to the duct 4.

In the right half a corresponding connection is shown. These two adjoining cell-spaces have an open connection with each other via the supporting grid 26 in the way as indicated in the drawing, thus connecting the concentrating liquids in the two adjoining units of which each half-intermediate cell frame forms a part.

In those cases where it is not desirable to have the liquid in the cell span communicate with the ducts 3 and 4 (or 2 and 5 respectively) of the adjoining cell units, it is possible to mount a membrane on one side or on both sides of said supporting grid 26, preferably a membrane which is substantially neutral, such as a membrane of regenerated cellulose. In that case measures should be taken that a preferably minor continuous flow of liquid is passed through the space proper of the intermediate cell span which is locked in between said membranes. Since the said membranes need not be rinsed as thoroughly as the permselective membranes the filler structure may consist of a perforated thick plate or of a relatively thin porous place provided with a number of supporting ribs so as to fill up the remainder of the width of each of the half intermediate cell frames. The entire filler structure is then composed of two of said elements positioned with the supporting ribs against each other; some holes being provided in the ribs for purpose of liquid passage.

For the sake of clarity FIG. 6 shows on a considerably enlarged scale how the cells are alternately connected and not connected to one of the ducts.

Thin rings 27 of a stiff, non-conductive material are provided in the cells which are connected to the duct, between the membrane support 23 and the adjoining membranes 24 around the holes in the membranes. The rings 25 which block the connection of other cells with this channel may be of a compressible material.

FIG. 7 shows a part of a complete apparatus. This shows an outer frame 30 consisting of U-girders with connecting irons 31, on which an end-plate 32, an electrode cell 33 with a separate liquid supply duct 34, followed by a first portion of the whole membrane packet consisting of two half-intermediate-cell frames 1 with membranes 35 present between them. The two half-intermediate-cell frames of this unit are interconnected by means of a number of span bolts 36 consisting of externally hexagonal hollow tubes provided with inner screw-threads and cooperating with bolts or studs passed through the holes 10 in the said frames.

The half-intermediate-cell frames are provided with connecting pieces or liquid connections 7 which may be fixed thereto by means of bolts.

The intermediate cell units are suspended in the frame 30 by means of the supports 13 resting upon the bars 15, which supports may be provided at their lower side 14 with reinforcing plates of wear-proof metal.

To assemble the apparatus, the various intermediate cell units which are put together in a separate suitable press and which have been tested for leaks are successively hung on the bar 15. The supporting grids 26 may be provided beforehand, in which case they should consist of two fitting halves just like the half cell spans formed by one of the intermediate cell frames themselves.

It also stands to reason that the two half-intermediate-cell frames on both sides of the whole apparatus may serve as final electrode cells.

After the desired number of intermediate cell units have been hung in the apparatus the second end-electrode and the second end-plate are mounted and the whole is pressed together, preferably hydraulically, and fixed in this position by means of connecting rods 37 and nuts 38 mounted between the two end-plates. After the necessary liquid and current connections have been provided the apparatus is in working order.

The total desalting space of the various intermediate cell units of the membrane packet can be mutually connected in series or parallel or also as a combination of these. With series connection of all the intermediate cell units, the same liquid is passed through the apparatus several times, which gives a relatively small capacity but considerable desalting. With parallel connection on the other hand the maximal capacity is used and comparatively little desalting is obtained.

In order to keep the electric resistance of the intermediate cell spans as low as possible the open space in the two half-intermediate-cell frames is made as large as possible, their edges being therefore as close as possible to the cross ducts for the distribution of liquid.

Both the inner and outer shape of the intermediate cells is preferably, but not necessarily, rectangular. In principle any shape is possible if the two half-intermediate-cell frames which lie against each other fit like two reflected images.

We claim:

1. A multicell electrodialyzing apparatus comprising rigid end plates, an anode electrode at one end of said apparatus, a cathode electrode at the other end of said apparatus, a plurality of alternately arranged anion permeable and cation permeable membranes between said electrodes with gaskets of deformable material between each membrane forming a membrane and gasket stack, conduits for dialysate and rinse liquid formed in said membrane and gasket stack, means to separate said membrane and gasket stack into alternate concentrating and diluting cells, said membrane and gasket stack being divided into a plurality of intermediate cell units, each intermediate cell unit having two structurally identically rigid half-intermediate cell frames extending peripherially outside the membrane and gasket stack and having a central opening therethrough of the same approximate size as the effective membrane surface area in adjacent concentrating and diluting cells, said half-intermediate-cell frames being attached to each other to form a manageable and replaceable intermediate cell unit having interposed between them from 20 to 200 of said membranes, said rigid half-intermediate-cell frames of adjacent intermediate cell units abutting each other, being mirror images each of the other, and forming a cell span therebetween, said rigid half-intermediate-cell frames having separate dialysate and rinse liquid connections cooperating with said conduits for dialysate and rinse liquid in said membrane and gasket stack and having means to pass an electroconducting liquid through said cell span, and mounting means to hold said abutting intermediate cell units in water tight engagement.

2. A multicell electrodialyzing apparatus as claimed in claim 1 wherein said two rigid half-intermediate-cell frames are attached together by a plurality of span bolts passing through appropriate holes in the part of said rigid half-intermediate-cell frames extending outside of said membrane and gasket stack.

3. A multicell electrodialyzing apparatus as claimed in claim 1 wherein said abutting rigid half-intermediate-cell frames of each intermediate cell unit form a cell span, said cell span being substantially filled with a porous member containing channels so as to provide an uninterrupted path for the electrical current.

4. A multicell electrodialyzing apparatus as claimed in claim 3 wherein said cell span is interconnected with one of said conduits for dialysate and rinse liquid.

5. An electrodialytic cell comprising a plurality of units comprising a plurality of ion-permeable membranes alternating with flexible spacers to form narrow compartments bounded on their opposite major faces by said membranes and around their peripheries by said spacers, and each of said units also comprising two rigid spacers, one at each end, all the spacers being formed with holes which register to constitute continuous passages for the supply of electrolytes to the compartments, means joining the two rigid spacers of each unit together, electrodes for the passage of current through the cell, and means clamping said units together.

6. An electrodialytic cell comprising a plurality of units comprising a plurality of ion-permeable membranes alternating with flexible spacers to form narrow compartments bounded on their opposite major faces by said membranes and around their peripheries by said spacers, each of said units also comprising two rigid spacers, one at each end, passages leading through series of registering holes in the membranes and into the space between the membranes to constitute continuous passages for the supply and discharge of liquids to the compartments of the unit concerned, means joining two rigid spacers of each unit together, electrodes for the passage of current through the cell, and means clamping said units together.

References Cited in the file of this patent

UNITED STATES PATENTS

| | | |
|---|---|---|
| 2,741,591 | Dewey et al. | Apr. 10, 1956 |
| 2,784,158 | Bodamer | Mar. 15, 1957 |